US010965902B2

(12) United States Patent
Sugita

(10) Patent No.: US 10,965,902 B2
(45) Date of Patent: Mar. 30, 2021

(54) INFORMATION PROCESSING APPARATUS AND CONTROL METHOD THEREFOR

(71) Applicant: CANON KABUSHIKI KAISHA, Tokyo (JP)

(72) Inventor: Norio Sugita, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 34 days.

(21) Appl. No.: 16/170,189

(22) Filed: Oct. 25, 2018

(65) Prior Publication Data
US 2019/0132545 A1 May 2, 2019

(30) Foreign Application Priority Data
Oct. 31, 2017 (JP) .............................. JP2017-210958

(51) Int. Cl.
G06F 3/0484 (2013.01)
H04N 5/77 (2006.01)
G06T 7/70 (2017.01)
G06T 11/00 (2006.01)
G06T 7/11 (2017.01)

(52) U.S. Cl.
CPC ............. H04N 5/77 (2013.01); G06T 7/70 (2017.01); G06T 11/00 (2013.01); G06F 3/04845 (2013.01); G06T 7/11 (2017.01); G06T 2207/20021 (2013.01); G06T 2207/30242 (2013.01)

(58) Field of Classification Search
None
See application file for complete search history.

(56) References Cited

U.S. PATENT DOCUMENTS 9,325,869 B2 * 4/2016 Nagasaka .......... H04N 1/00448
9,483,701 B1 * 11/2016 Kwatra ................. G06K 9/6255
2006/0053370 A1 3/2006 Hitaka et al.
2013/0301938 A1 * 11/2013 Chen .................. G06K 9/00221
382/224
2016/0110356 A1 * 4/2016 Kruglick .............. G06K 9/4614
707/747

* cited by examiner

Primary Examiner — Mark T Monk
(74) Attorney, Agent, or Firm — Cowan, Liebowitz & Latman, P.C.

(57) ABSTRACT

An information processing apparatus includes a processor; and a memory storing a program which, when executed by the processor, causes the information processing apparatus to: store a plurality of combinations of associated subject information and layout information in a storage unit, the subject information relating to a subject appearing on an image and the layout information indicating a layout in which the image is to be arranged; perform image analysis on a target image and obtain the subject information relating to the subject appearing on the target image according to a result of the image analysis; select layout information that corresponds to the obtained subject information in relation to the target image from the plurality of layout information stored in the storage unit, and arrange the target image according to the selected layout information, wherein the subject information includes a type of the subject appearing on the image.

15 Claims, 12 Drawing Sheets

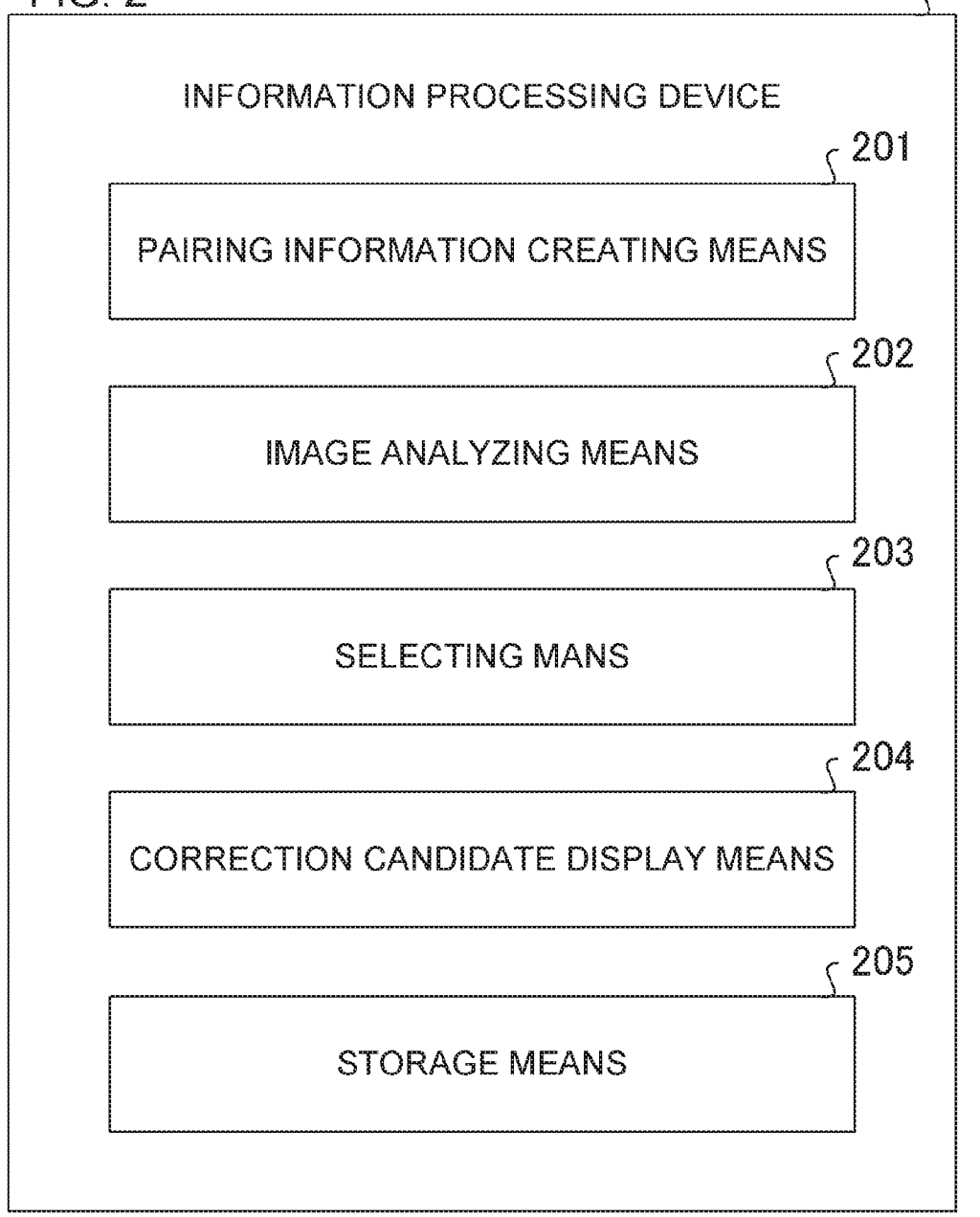

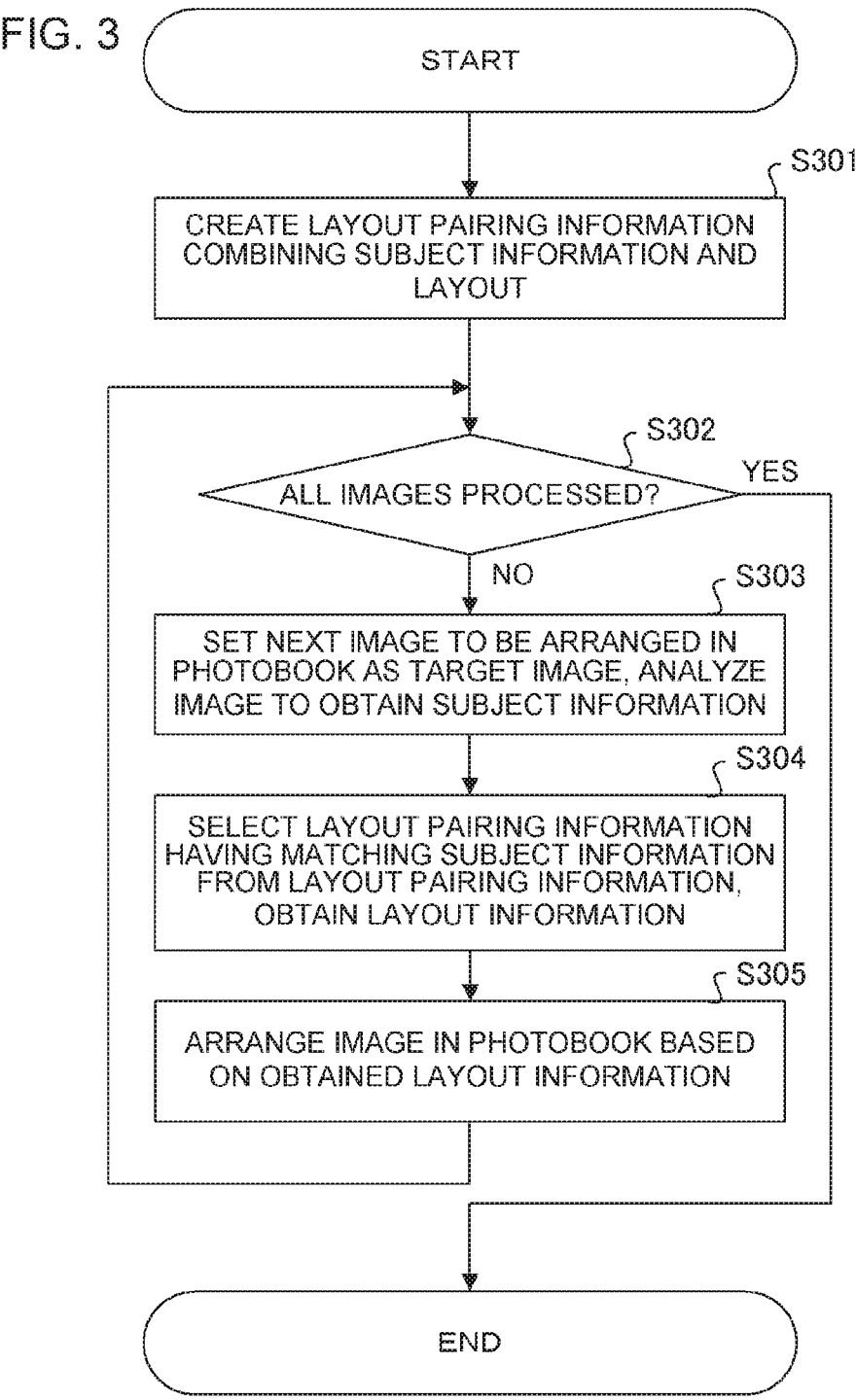

FIG. 4

| NUMBER | CATEGORY | COMPOSITION | | | | LAYOUT |
|---|---|---|---|---|---|---|
| | | DIRECTION | NUMBER | VERTICAL | HORIZONTAL | |
| 1 | PEOPLE | LANDSCAPE | PLURAL | WHOLE | WHOLE | A: ONE PAGE, SQUARE IMAGE |
| 2 | PEOPLE | PORTRAIT | 1 | WHOLE | BOTTOM SIDE | B: ONE PAGE, TWO IMAGES |
| 3 | PEOPLE | LANDSCAPE | PLURAL | LEFT SIDE | BOTTOM SIDE | B: ONE PAGE, TWO IMAGES |
| 4 | PEOPLE | PORTRAIT | 1 | WHOLE | WHOLE | C: ONE PAGE, RECTANGULAR IMAGE |
| 5 | ANIMALS | LANDSCAPE | 1 | WHOLE | BOTTOM SIDE | B: ONE PAGE, TWO IMAGES |
| 6 | ANIMALS | PORTRAIT | 1 | WHOLE | CENTER | B: ONE PAGE, TWO IMAGES |
| 7 | ANIMALS | LANDSCAPE | PLURAL | WHOLE | WHOLE | A: ONE PAGE, SQUARE IMAGE |
| 8 | PLANTS | LANDSCAPE | 1 | WHOLE | BOTTOM SIDE | B: ONE PAGE, TWO IMAGES |
| 9 | PLANTS | PORTRAIT | 1 | CENTER | WHOLE | C: ONE PAGE, RECTANGULAR IMAGE |
| 10 | VEHICLES | LANDSCAPE | 1 | WHOLE | BOTTOM SIDE | B: ONE PAGE, TWO IMAGES |
| 11 | VEHICLES | LANDSCAPE | 1 | WHOLE | CENTER | B: ONE PAGE, TWO IMAGES |
| 12 | VEHICLES | LANDSCAPE | 1 | WHOLE | WHOLE | D: DOUBLE SPREAD, RECTANGULAR IMAGE |
| 13 | BUILDINGS | LANDSCAPE | 1 | WHOLE | WHOLE | D: DOUBLE SPREAD, RECTANGULAR IMAGE |
| 14 | BUILDINGS | PORTRAIT | 1 | WHOLE | WHOLE | C: ONE PAGE, RECTANGULAR IMAGE |
| 15 | LANDSCAPES | LANDSCAPE | 1 | WHOLE | WHOLE | D: DOUBLE SPREAD, RECTANGULAR IMAGE |

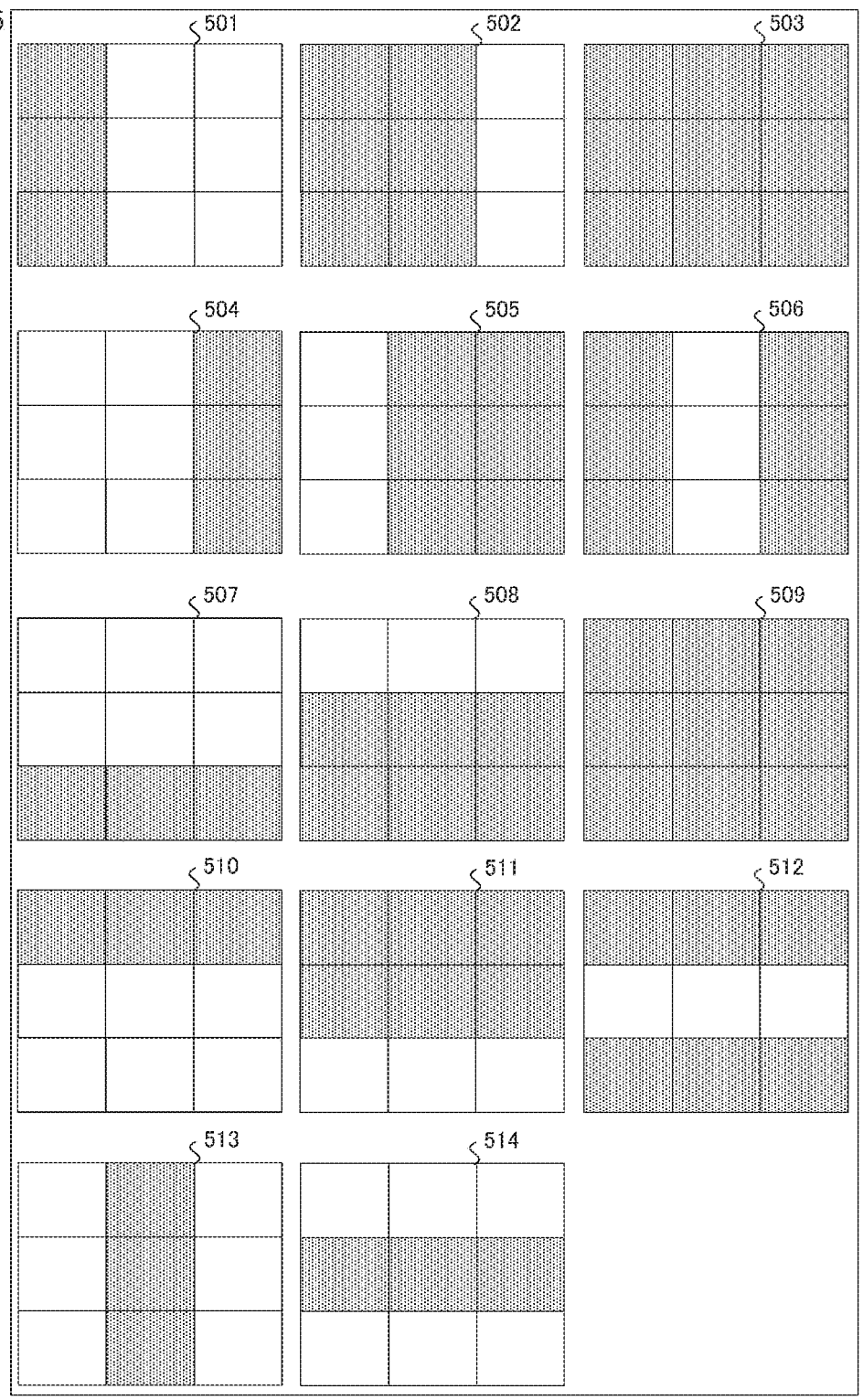

FIG. 7

| NUMBER | CATEGORY | COMPOSITION ||||  LAYOUT |
|---|---|---|---|---|---|---|
| | | DIRECTION | NUMBER | VERTICAL | HORIZONTAL | |
| 1 | PEOPLE | LANDSCAPE | PLURAL | WHOLE | WHOLE | A: ONE PAGE, SQUARE IMAGE |
| 2 | PEOPLE | PORTRAIT | 1 | WHOLE | BOTTOM SIDE | B: ONE PAGE, TWO IMAGES |
| 3 | PEOPLE | LANDSCAPE | PLURAL | LEFT SIDE | BOTTOM SIDE | B: ONE PAGE, TWO IMAGES |
| 4 | PEOPLE | PORTRAIT | 1 | WHOLE | WHOLE | C: ONE PAGE, RECTANGULAR IMAGE |
| 5 | ANIMALS | LANDSCAPE | 1 | WHOLE | BOTTOM SIDE | B: ONE PAGE, TWO IMAGES |
| 6 | ANIMALS | PORTRAIT | 1 | WHOLE | CENTER | B: ONE PAGE, TWO IMAGES |
| 7 | ANIMALS | LANDSCAPE | PLURAL | WHOLE | WHOLE | A: ONE PAGE, SQUARE IMAGE |
| 8 | PLANTS | LANDSCAPE | 1 | WHOLE | BOTTOM SIDE | B: ONE PAGE, TWO IMAGES |
| 9 | PLANTS | PORTRAIT | 1 | CENTER | WHOLE | C: ONE PAGE, RECTANGULAR IMAGE |
| 10 | VEHICLES | LANDSCAPE | 1 | WHOLE | BOTTOM SIDE | B: ONE PAGE, TWO IMAGES |
| 11 | VEHICLES | LANDSCAPE | 1 | WHOLE | CENTER | B: ONE PAGE, TWO IMAGES |
| 12 | VEHICLES | LANDSCAPE | 1 | WHOLE | WHOLE | D: DOUBLE SPREAD, RECTANGULAR IMAGE |
| 13 | BUILDINGS | LANDSCAPE | 1 | WHOLE | WHOLE | D: DOUBLE SPREAD, RECTANGULAR IMAGE |
| 14 | BUILDINGS | PORTRAIT | 1 | WHOLE | WHOLE | C: ONE PAGE, RECTANGULAR IMAGE |
| 15 | LANDSCAPES | LANDSCAPE | 1 | WHOLE | WHOLE | D: DOUBLE SPREAD, RECTANGULAR IMAGE |

FIG. 10

| CATEGORY | COMPOSITION ||||  LAYOUT | NUMBER OF USES |
| --- | --- | --- | --- | --- | --- | --- |
| | DIRECTION | NUMBER | VERTICAL | HORIZONTAL | | |
| PEOPLE | LANDSCAPE | PLURAL | WHOLE | WHOLE | B | 7 |
| PEOPLE | LANDSCAPE | PLURAL | WHOLE | WHOLE | A | 6 |
| PEOPLE | PORTRAIT | 1 | BOTTOM SIDE | WHOLE | B | 5 |
| PEOPLE | PORTRAIT | 1 | WHOLE | WHOLE | C | 4 |
| PEOPLE | LANDSCAPE | PLURAL | WHOLE | WHOLE | B | 3 |
| LANDSCAPES | LANDSCAPE | 1 | WHOLE | WHOLE | D | 8 |
| LANDSCAPES | LANDSCAPE | 1 | WHOLE | WHOLE | B | 3 |

INFORMATION PROCESSING APPARATUS AND CONTROL METHOD THEREFOR

BACKGROUND OF THE INVENTION

Field of the Invention

The present invention relates to content creation support.

Description of the Related Art

In a system for creating content such as a photobook, a user sets a layout for each page using an interface displayed on a screen. In an example of a provided service, a photobook can be created by arranging images captured by a digital camera or the like and text edited using a text editor on each page of a photobook displayed on the screen of a PC terminal. The created photobook can also be printed using a home printer, or printing can be ordered on a store terminal or on the Internet.

In another system for creating a photobook, a layout is estimated for each page of the photobook and images are arranged on each page automatically on the basis of the estimated layouts. In US Patent Application Publication No. 2006/0053370, for example, a photobook is created by selecting a layout corresponding to the number of images to be arranged on the page and arranging the images on the page on the basis of the selected layout.

SUMMARY OF THE INVENTION

In certain cases, however, the user may wish to determine the layout in accordance with the content of the image, such as displaying an image showing a larger number of people in the center of the page in enlarged form and displaying an image showing a single building in a corner of the page. When the method of US Patent Application Publication No. 2006/0053370 is used in such cases, the expected layout is unlikely to be selected.

In consideration of the problem described above, an object of the present invention is to provide a technique for selecting a more appropriate layout in accordance with the content of an image.

An aspect of the present invention provides an information processing apparatus comprising: a processor; and a memory storing a program which, when executed by the processor, causes the information processing apparatus to: store a plurality of combinations of associated subject information and layout information in a storage unit, the subject information relating to a subject appearing on an image and the layout information indicating a layout in which the image is to be arranged; perform image analysis on a target image and obtain the subject information relating to the subject appearing on the target image according to a result of the image analysis; select layout information that corresponds to the obtained subject information in relation to the target image from the plurality of layout information stored in the storage unit, and arrange the target image according to the selected layout information, wherein the subject information includes a type of the subject appearing on the image.

A second aspect of the present invention provides a control method for an information processing apparatus, comprising: a step of performing image analysis on a target image and obtaining subject information relating to a subject appearing on the target image according to a result of the image analysis; and a step of selecting, from a plurality of layout information stored in a storage unit that stores a plurality of combinations of associated subject information and layout information, the subject information relating to a subject appearing on an image and the layout information indicating a layout in which the image is to be arranged, layout information that corresponds to the subject information obtained in the obtaining step in relation to the target image, and a step of arranging the target image according to the selected layout information, wherein the subject information includes a type of the subject appearing on the image.

A third aspect of the present invention provides a non-transitory computer readable storing medium recording a computer program for causing a computer to perform a method of controlling an information processing apparatus that determines a layout in which a target image is to be arranged, comprising: a step of performing image analysis on a target image and obtaining subject information relating to a subject appearing on the target image according to a result of the image analysis; and a step of selecting, from a plurality of layout information stored in a storage unit that stores a plurality of combinations of associated subject information and layout information, the subject information relating to a subject appearing on an image and the layout information indicating a layout in which the image is to be arranged, layout information that corresponds to the subject information obtained in the obtaining step in relation to the target image, and a step of arranging the target image according to the selected layout information, wherein the subject information includes a type of the subject appearing on the image.

According to the present invention, a more appropriate layout can be provided in accordance with the content of an image.

Further features of the present invention will become apparent from the following description of exemplary embodiments with reference to the attached drawings.

BRIEF DESCRIPTION OF THE DRAWINGS

FIG. 2 is a block diagram illustrating a configuration of an application program;

FIG. 3 is a flowchart showing photobook creation procedures;

FIG. 4 is a view showing an example of a table on which layout pairing information is registered;

FIG. 5 is a view illustrating compositions;

FIG. 7 is a view illustrating processing executed by selecting means;

FIG. 10 is a view illustrating creation of the layout pairing information;

DESCRIPTION OF THE EMBODIMENTS

Figure 1:
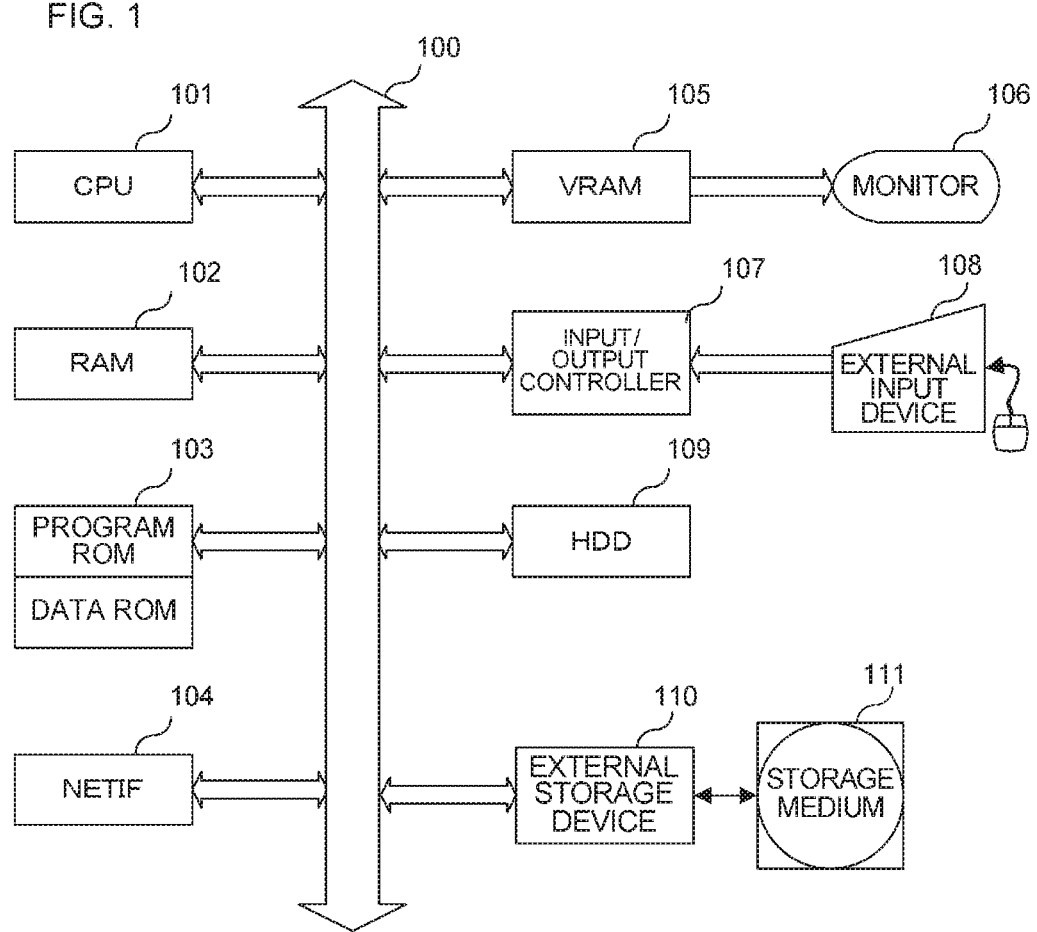
FIG. 1 is a block diagram showing an example of a hardware configuration of an information processing apparatus.

Preferred embodiments of the present invention will be described in detail below with reference to the figures. As a rule, identical reference numerals have been allocated to identical configurations in the figures, and duplicate description thereof has been omitted. Further, unless specifically noted otherwise, the present invention is not limited to exemplary numerical values and so on used to illustrate specific embodiments thereof.

Furthermore, the present invention is not limited to the following embodiments and may be modified as appropriate within a scope that does not depart from the spirit thereof. For example, the respective configurations of the following embodiments may be amended or modified as appropriate by amending or modifying various conditions and the configuration of the apparatus to which the present invention is applied.

First Embodiment

Hardware Configuration

FIG. 1 is a block diagram showing an example of a hardware configuration of an information processing apparatus 10. In FIG. 1, a CPU 101 controls calculations performed during various types of processing and various processing units. A RAM (Random Access Memory) 102 serves as a main memory of the CPU 101, which is used as an area in which an execution program is expanded and a data area.

A ROM (Read Only Memory) 103 is a memory storing operation processing procedures of the CPU 101. The ROM 103 includes a program ROM in which an operating system (OS), i.e. a system program for executing apparatus control on the information processing apparatus, is recorded, and a data ROM on which information required to operate the system and so on are recorded. Further, an HDD 109 to be described below, a NAND type flash memory, an SD card, a solid-state drive (SSD), and so on may be used instead of the ROM 103.

A NET IF 104 is a network interface that executes control and connection state diagnosis so that data can be transmitted to and received from the information processing apparatus over a network. A VRAM (Video Random Access Memory) 105 expands and executes display control on photobook information to be displayed on the screen of a monitor 106 that shows the operating state of the information processing apparatus, to be described below.

The monitor 106 is a display device such as a display. An input/output controller 107 controls input signals from an external input device 108. The external input device 108 receives operations performed by a user, and as well as a keyboard, includes a pointing device such as a mouse or an input device such as a touch panel display.

The HDD (Hard Disk Drive) 109 is used as a storage area for storing an application program and various data. A NAND type flash memory, an SD card, a solid-state drive (SSD), and so on may be used instead of an HDD. Note that the application program is a software program (a module) or the like for executing various processing means according to this embodiment.

An external storage device 110 is used to read the aforesaid application program from a medium and so on. For example, the external storage device 110 is a floppy disk drive, a CD-ROM drive, or a removable disk such as an SD card. Further, a storage medium 111 is constituted by a magnetic recording medium such as a floppy disk read by the external storage device 110. Note that the storage medium 111 is not limited to a floppy disk, and may be any removable data recording device (removable medium), such as an optical recording medium (a CD-ROM, for example), a magneto-optical recording medium (an MO, for example), or a semiconductor recording medium (an SD card, for example). Note that the application program and data stored in the HDD 109 can also be stored for use in the external storage device 110.

Configuration of Application Program

FIG. 2 is a block diagram illustrating the configuration of the application program. In this embodiment, a processing module group and information executed in the information processing apparatus 10 are stored in the HDD 109 or the like. The processing of each processing module in the processing module group, executed in accordance with the application program, will be described below.

In FIG. 2, the information processing apparatus 10 includes pairing information creating means 201, image analyzing means 202, selecting means 203, correction candidate display means 204, and a storage unit 205. These processing modules are read from the ROM 103, HDD 109, or external storage device 110 shown in FIG. 1 and expanded in the RAM 102 so as to operate as the application program, or parts of the program, used by the CPU 101. The storage unit 205 is a storage area secured in the HDD 109, for example, in order to store information including subject information, compositions, layout information, and layout pairing information. The various types of information will be described in detail below.

In response to an instruction issued by the information processing apparatus 10 or an instruction input by an operator using the external input device 108, instruction content is transmitted to the CPU 101. The CPU 101 obtains a program corresponding to the processing module that corresponds to the instruction content from the ROM 103, the HDD 109, the external storage device 110, the RAM 102, or the like, expands the program in the RAM 102, and executes corresponding processing. The CPU 101 then writes calculation results to the RAM 102, the HDD 109, the external storage device 110, or the like. Further, if necessary, the CPU 101 displays the calculation results on the monitor 106 via the VRAM 105. By executing the operations described above, processing corresponding to the respective processing modules is performed. Note that data transfer between the CPU 101, the RAM 102, the ROM 103, the NET IF 104, the VRAM 105, the input/output controller 107, the HDD 109, and the external storage device 110 is executed via a transfer bus 100.

The pairing information creating means 201 obtains the subject information and layout information stored in the storage unit 205. The subject information is information relating to a subject included in an image, and includes a category and a composition, the category indicating the type of subject, such as a person or an animal, and the composition including the orientation (direction) of the image, information indicating the position of the subject on the image, and the number of subjects. The subject position information is information indicating a region, among a plurality of regions obtained by segmenting the image, to which the subject belongs. For example, when the image is segmented into a plurality of rows and columns, the subject position information indicates the row and column to which the subject belongs.

Note that specific examples of compositions will be described below.

Further, the layout information is information indicating a range in which images are to be arranged (laid out) in a photobook, and includes information such as the number of images to arrange on a page and whether to arrange images on a single page or over a double spread, for example. The layout information also includes information indicating the shape of the image (square, rectangular, and so on). Note that the layout information may be expressed as several patterns, and in the example described below, the layout information is expressed as four patterns, namely A, B, C, and D.

The pairing information creating means 201 registers a combination of associated subject information and layout information on a table, and stores a plurality of combinations of subject information and layout information in the storage unit 205. Hereafter, a combination of associated subject information and layout information will be referred to as layout pairing information. Note that FIG. 4 shows an example of the table on which the layout pairing information is registered.

The image analyzing means 202 (obtaining means) obtains the subject information relating to the subject included in a target image. The target image is an image currently being subjected to photobook creation processing (processing shown in FIG. 3, to be described below), and when the processing is complete, the next image to be arranged in the photobook is set as the target image.

The selecting means 203 specifies the layout pairing information corresponding to the subject information of the target image from the plurality of layout pairing information registered on the table of the storage unit 205, and selects the layout information included in the specified layout pairing information. The information processing apparatus 10 then arranges the target image on the basis of the selected layout information.

FIG. 3 is a flowchart showing photobook creation procedures. The processing of this embodiment will now be described specifically in accordance with the flow of FIG. 3, using specific examples.

In step S301, the pairing information creating means 201 obtains the subject information and the layout information stored in the storage unit 205, and creates layout pairing information (the table shown in FIG. 4, for example) by combining the subject information and layout information.

Note that when the layout pairing information (the table) is already stored in the storage unit 205, processing from step S302 onward may be executed using the layout pairing information, and in this case, the pairing information creating means 201 does not have to perform the processing of step S301.

Next, using FIGS. 4 and 5, the layout pairing information created in step S301 will be described more specifically.

FIG. 4 is a view showing an example of the table on which the layout pairing information is registered. One set of layout pairing information is registered on each row of the table shown in FIG. 4. The subject information is shown in respective columns titled category 402 and composition 403, while the layout information is shown in a column titled layout 404.

The respective items on the table shown in FIG. 4 will now be described. A number 401 denotes a number of the layout pairing information. A unique combination of the category and composition of the layout pairing information is set on each row, and the number 401 is appended to each row. The category 402 denotes the type of subject, and in this embodiment, six categories, namely people, animals, plants, vehicles, buildings, and landscapes, are defined. The composition 403 includes the orientation (direction) of the image, indicating whether the image is a portrait image or a landscape image, the number of subjects, and the vertical and horizontal compositions. Note that the vertical and horizontal compositions will be described below.

The layout 404 is divided into patterns corresponding to the position and range in which the image is to be arranged, and in this embodiment, four patterns indicated by the alphabetic characters A, B, C, and D are used. For example, A (layout A hereafter) is a pattern in which a square image is arranged on a single page. B (layout B hereafter) is a pattern in which two images are arranged on a single page. C (layout C hereafter) is a pattern in which a rectangular image is arranged on a single page. D (layout D hereafter) is a pattern in which a rectangular image is arranged over a double spread. Note that when the shape of the target image is different to the image shape (square, rectangular, and so on) specified by the layout information, the information processing apparatus 10 may arrange the target image on the page after enlarging or reducing the target image in accordance with the shape specified by the layout information. The information processing apparatus 10 may also trim the target image if necessary.

Note that the layout information shown in FIG. 4 is an example, and the present invention is not limited to the layout information illustrated in FIG. 4. For example, the layout information may be configured such that three or more images are arranged on a single page, and when a plurality of images are to be arranged on a single page, the layout information may specify the shape (square or the like) of each image. Further, the layout information may indicate either that text is not to be arranged or that text is to be superimposed on the image.

FIG. 5 is a view illustrating compositions. The composition 403 illustrated in FIG. 4 includes a vertical composition and a horizontal composition, and the image analyzing means 202 determines the vertical composition and the horizontal composition on the basis of analysis results obtained from the target image. In the example shown in FIG. 5, the image analyzing means 202 divides the target image into nine regions constituted by three vertical columns and three horizontal rows, determines (specifies) the regions of the target image in which the subject exists, and then determines the composition (the vertical composition and the horizontal composition) of the subject captured on the image.

Compositions 501 to 506 and 513 in FIG. 5 indicate vertical compositions, while compositions 507 to 512 and 514 indicate horizontal compositions. The composition 501 shows a case in which the subject exists in a region occupying a single left-side column of the three vertical columns, and this is set as a vertical left-side (left one-column) composition. The composition 502 shows a case in which the subject exists in a region occupying two columns, namely the left-side column and a center column, of the three vertical columns, and this is set as a vertical left-side (left two-column) composition. The composition 503 shows a case in which the subject exists in a region occupying three columns, namely the left-side column, the center column, and a right-side column, of the three vertical columns, and this is set as a vertical whole (three-column) composition. The composition 504 shows a case in which the subject exists in a region occupying one column, namely the right-side column, of the three vertical columns, and this is set as a vertical right-side (right one-column) composition. The composition 505 shows a case in which the subject exists in a region occupying two columns, namely the right-side column and the center column, of the three vertical columns, and this is set as a vertical right-side (right two-column) composition. The composition 506 shows a case in which the subject is divided between regions occupying two columns, namely the left-side column and the right-side column, of the three vertical columns, and this is set as a vertical whole (left-right two-column) composition.

The composition 507 shows a case in which the subject exists in a region occupying one row, namely a bottom row, of the three horizontal rows, and this is set as a horizontal bottom-side (bottom one-row) composition. The composition 508 shows a case in which the subject exists in a region occupying two rows, namely the bottom row and a center row, of the three horizontal rows, and this is set as a horizontal bottom-side (bottom two-row) composition. The composition 509 shows a case in which the subject exists in a region occupying three rows, namely the bottom row, the center row, and a top row, of the three horizontal rows, and this is set as a horizontal whole (three-row) composition. The composition 510 shows a case in which the subject exists in a region occupying one row, namely the top row, of the three horizontal rows, and this is set as a horizontal top (top one-row) composition. The composition 511 shows a case in which the subject exists in a region occupying two rows, namely the top row and the center row, of the three horizontal rows, and this is set as a horizontal top (top two-row) composition. The composition 512 shows a case in which the subject is divided between regions occupying two rows, namely the top row and the bottom row, of the three horizontal rows, and this is set as a horizontal whole (top-bottom two-row) composition.

The composition 513 shows a case in which the subject exists in a region occupying one column, namely the center column, of the three vertical columns, and this is set as a vertical center (center one-row) composition. The composition 514 shows a case in which the subject exists in a region occupying one row, namely the center row, of the three horizontal rows, and this is set as a horizontal center (center one-row) composition.

Returning to FIG. 3, in step S302, the information processing apparatus 10 determines whether or not all images have been processed, and when all images have been processed, the information processing apparatus 10 terminates the processing of FIG. 3. When an unprocessed image still exists, the information processing apparatus 10 advances to the processing of step S303.

In step S303, the image analyzing means 202 performs image analysis using the next image to be arranged in the photobook as the target image, and obtains the subject information.

During image analysis, the image analyzing means 202 may use a method of extracting features of the subject and identifying the subject by pattern matching or a machine learning method, for example. Further, the range (the display region) of the subject may be determined from contours obtained by edge detection or using a region having a fixed shape, such as a rectangle or a circle.

Figure 6:
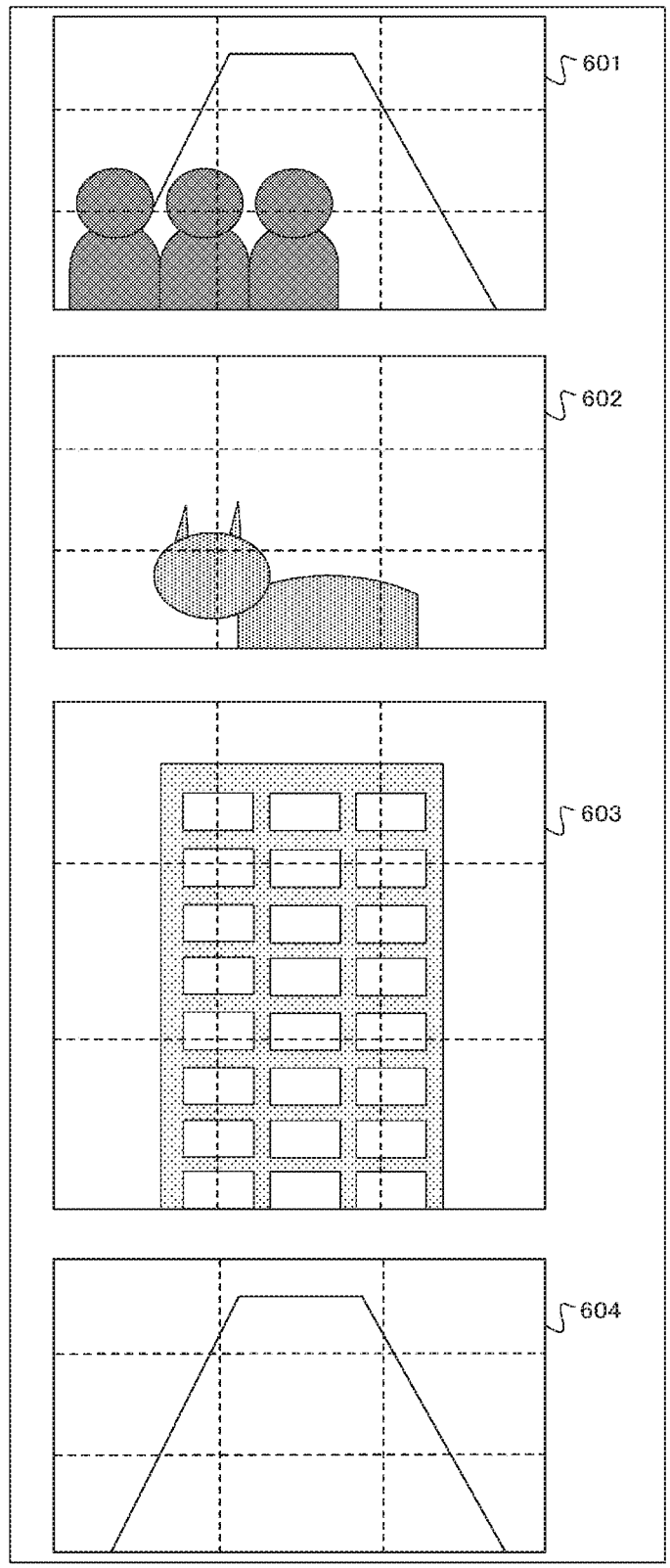
FIG. 6 is a view illustrating image analysis.

FIG. 6 is a view illustrating the image analysis. Images 601 to 604 are examples of target images. The image analyzing means 202 subjects the image 601 to image analysis and detects three people and a mountain landscape as subjects. The image analyzing means 202 determines "people" as the category of the image 601, and with regard to the composition of the image 601, determines that the orientation of the image is landscape, the number of subjects is plural, there being three people on the image, the vertical composition is left two-column (left side), and the horizontal composition is bottom two-row (bottom side). Note that although the image analyzing means 202 also detects the mountain landscape, in this embodiment, compositions including people are prioritized, and therefore the landscape composition is not taken into account. A subject hierarchy will be described below.

Further, the image analyzing means 202 subjects the image 602 to image analysis and detects a single animal as the subject. The image analyzing means 202 determines "animals" as the category of the image 602, and with regard to the composition of the image 602, determines that the orientation of the image is landscape, the number of subjects is singular, the vertical composition is three-column (whole), and the horizontal composition is bottom two-row (bottom side).

Note that in the case of the image 602, the area of the subject occupying the center row is comparatively small, and therefore the image analyzing means 202 may determine that the horizontal composition is the bottom one-row composition. In other words, a threshold may be provided in advance for each row and each column (each region), and when the area of the subject occupying a certain row or column equals or exceeds the corresponding threshold, the image analyzing means 202 may determine that the subject exists in that row or column.

Furthermore, the image analyzing means 202 subjects the image 603 to image analysis and detects a single building as the subject. The image analyzing means 202 determines "buildings" as the category of the image 603, and with regard to the composition of the image 603, determines that the orientation of the image is portrait, the number of subjects is singular, the vertical composition is three-column (whole), and the horizontal composition is three-row (whole).

Further, the image analyzing means 202 subjects the image 604 to image analysis and detects a single mountain as the subject. The image analyzing means 202 determines "landscapes" as the category of the image 604, and with regard to the composition of the image 604, determines that the orientation of the image is landscape, the number of subjects is singular, the vertical composition is three-column (whole), and the horizontal composition is three-row (whole).

Returning to FIG. 3, in step S304, the selecting means 203 selects, from the plurality of layout pairing information, the layout pairing information in which the subject information matches the subject information of the image subjected to image analysis, and obtains the layout information from the selected layout pairing information. More specifically, in this embodiment, the selecting means 203 selects the row that matches the subject information (the category and composition) of the target image from the rows of the table shown in FIG. 4, and obtains the layout information of the selected row.

FIG. 7 is a view illustrating the processing of the selecting means 203. FIG. 7 shows the layout pairing information, in which the shaded rows are the rows selected by the selecting means 203 on the basis of the results of the image analysis executed on the images 601 to 604 shown in FIG. 6.

A row 701 having the number 3 is the row selected on the basis of the image analysis result relating to the image 601. The image 601 also corresponds to the number 15, but the selecting means 203 prioritizes the row having the smaller number and therefore obtains the layout B of the row 701 having the number 3. Thus, when an image corresponds to a plurality of rows, the layout information of the row having a higher order of precedence is obtained.

Further, in FIG. 7, the categories are arranged in order of people, animals, plants, vehicles, buildings, and landscapes from the row having the lowest number. Thus, an order of precedence corresponding to the type of subject is provided for each category. Therefore, when two or more types of subjects exists on the target image, the layout pairing information is selected on the basis of the composition of the subject having the higher order of precedence. For example, when an animal and a plant are included on a single target image so that the category corresponds to two rows, namely the "animal" row and the "plant" row, the "animal" composition is prioritized so that the layout information on the "animal" row is selected.

Further, a row 702 having the number 5 is the row selected on the basis of the image analysis result relating to the image 602. The selecting means 203 obtains the layout B in relation to the image 602. A row 703 having the number 14 is the row selected on the basis of the image analysis result relating to the image 603. The selecting means 203 obtains the layout C in relation to the image 603. A row 704 having the number 15 is the row selected on the basis of the image analysis result relating to the image 604. The selecting means 203 obtains the layout D in relation to the image 604.

Returning to FIG. 3, in step S305, the information processing apparatus 10 arranges the target image in the photobook on the basis of the layout information obtained by the selecting means 203. At this time, the information processing apparatus 10 may arrange the target image on the page after enlarging or reducing the image in accordance with the layout information and the size of the page. Next, the information processing apparatus 10 returns to step S302 and performs the processing of steps S303 to S305 on the next target image. When all images have been processed, the information processing apparatus 10 terminates the processing.

After arranging the images on the page, the information processing apparatus 10 arranges text in the margins of the page. In this case, the information processing apparatus 10 may modify the font size of the alphabetic characters so that the text fits in the margins of the page.

Figure 8:
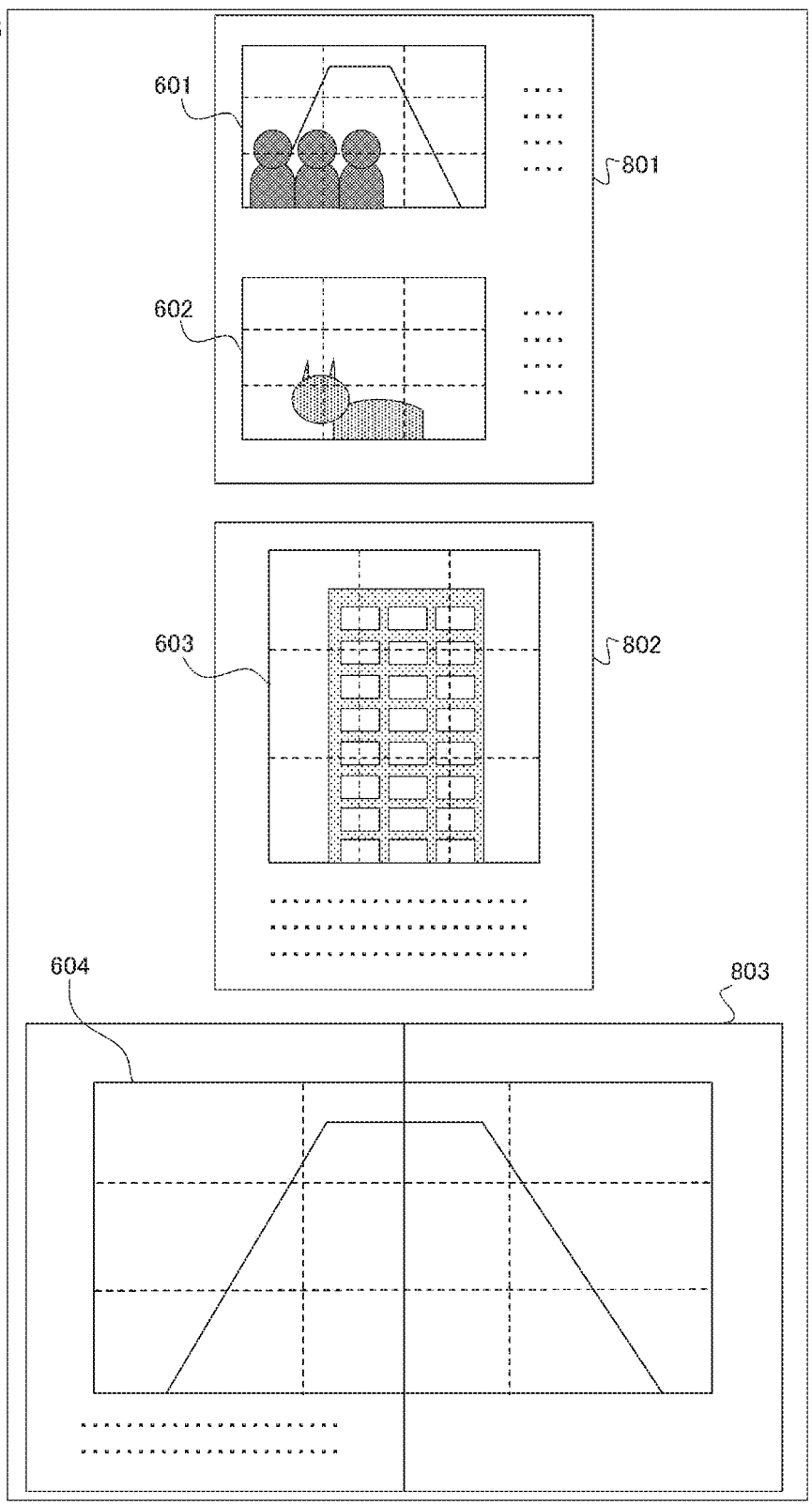
FIG. 8 is a view illustrating example applications of layout information.

FIG. 8 is a view showing example applications of the layout information. As described above, the image analyzing means 202 determines the vertical composition and horizontal composition of the target image by image analysis, whereupon the selecting means 203 obtains one of A, B, C, and D as the layout information on the basis of the determination result. The information processing apparatus 10 then arranges the target image on the basis of the layout information.

As shown on a page 801 in FIG. 8, for example, the layout B is applied to both the image 601 and the image 602 so that the two images, i.e. the image 601 and the image 602, are arranged on a single page. Further, as shown on a page 802 in FIG. 8, the layout C is applied to the image 603 so that the image 603 is arranged as a rectangular image on a single page. Furthermore, as shown on a page 803 in FIG. 8, the layout D is applied to the image 604 so that the image 604 is arranged as a rectangular image over a double spread.

Hence, in this embodiment, layout information corresponding to the type of the subject appearing on the target image and the composition of the target image is selected, whereupon the target image is arranged automatically on the basis of the selected target information. In so doing, images are arranged in a layout corresponding more closely to the preferences of the user, and as a result, the user does not have to exert as much effort on rearranging the images.

Further, in this embodiment, an order of precedence is provided for each subject type so that when two or more types of subjects appear on the target image, the layout is set on the basis of the composition of the subject having the higher order of precedence. As a result, the target image can be arranged in an appropriate layout even when the composition of the image is complex.

Furthermore, a case in which the processing of this embodiment is applied to the creation of a photobook was described above, but the present invention is not limited thereto, and this embodiment may also be applied to the creation of a single page of electronic content, such as a homepage or a blog, for example.

Moreover, a case in which the layout information is selected on the basis of the composition of the subject having the higher order of precedence when a plurality of types of subjects appear on the target image was described above, but the present invention is not limited thereto, and instead, for example, layout information corresponding to a combination of two or more subjects may also be provided. More specifically, on the table shown in FIG. 4, rows corresponding to combinations of subjects, such as rows in which the category is "person+animal", may be provided separately, and the layout pairing information may be generated by associating the layout information with each of the combination rows.

In the example shown in FIG. 7, the hierarchy is set in order of people, animals, plants, vehicles, buildings, and landscapes so that people (a first type) have the highest order of precedence, but the hierarchy is not limited thereto, and instead, for example, vehicles may be set to have a higher order of precedence than people.

Further, the user may set a hierarchy corresponding to the types of subjects. For example, if the user sets vehicles to have a high order of precedence, even when a subject other than a vehicle appears on the target image, the layout pairing information is selected in accordance with the composition of the vehicle.

Furthermore, in the example shown in FIG. 7, a hierarchy corresponding to the types of subjects is set, and during the processing for determining the vertical composition and horizontal composition, the composition of the subject having the highest order of precedence is prioritized. The present invention is not limited thereto, however, and instead, for example, when a plurality of types of subjects are included on the target image, the composition of the subject that occupies the greatest surface area of the target image may be prioritized. Alternatively, the composition of the subject that appears in the largest number on the target subject may be prioritized.

Moreover, in this embodiment, the information processing apparatus 10, having arranged the target image on the page, arranges text after adjusting the font size of the alphabetic characters so that the text fits in the margins of the page, but the present invention is not limited thereto, and instead, the information processing apparatus 10 may keep the alphabetic characters at a fixed font size and arrange the text after enlarging or reducing the target image so that the text fits in the margins of the page. In so doing, a situation in which the font of the alphabetic characters is so small that the text becomes difficult to read can be avoided.

Further, the layout information may include a text layout in addition to the layout of the target image.

Furthermore, in this embodiment, an example in which the subject information is obtained by performing image analysis on the target image was described, but the present invention is not limited thereto, and the subject information may be obtained from additional information attached to the target image. The additional information may be an Exif (registered trademark), for example.

Second Embodiment

In this embodiment, an example in which the layout pairing information is created on the basis of the respective layouts of images in an existing photobook created in the past will be described.

In this embodiment, the pairing information creating means 201 obtains subject information relating to the subjects appearing on the images arranged in the photobook (predetermined content) and layout information indicating the layouts of the images arranged in the photobook. Next, the pairing information creating means 201 creates a combination of associated subject information and layout information as the layout pairing information, and registers the created information on the table in the storage unit 205. Note that the procedures for creating the photobook are identical to the first embodiment. Specific procedures for creating the layout pairing information will be described below.

Figure 9:
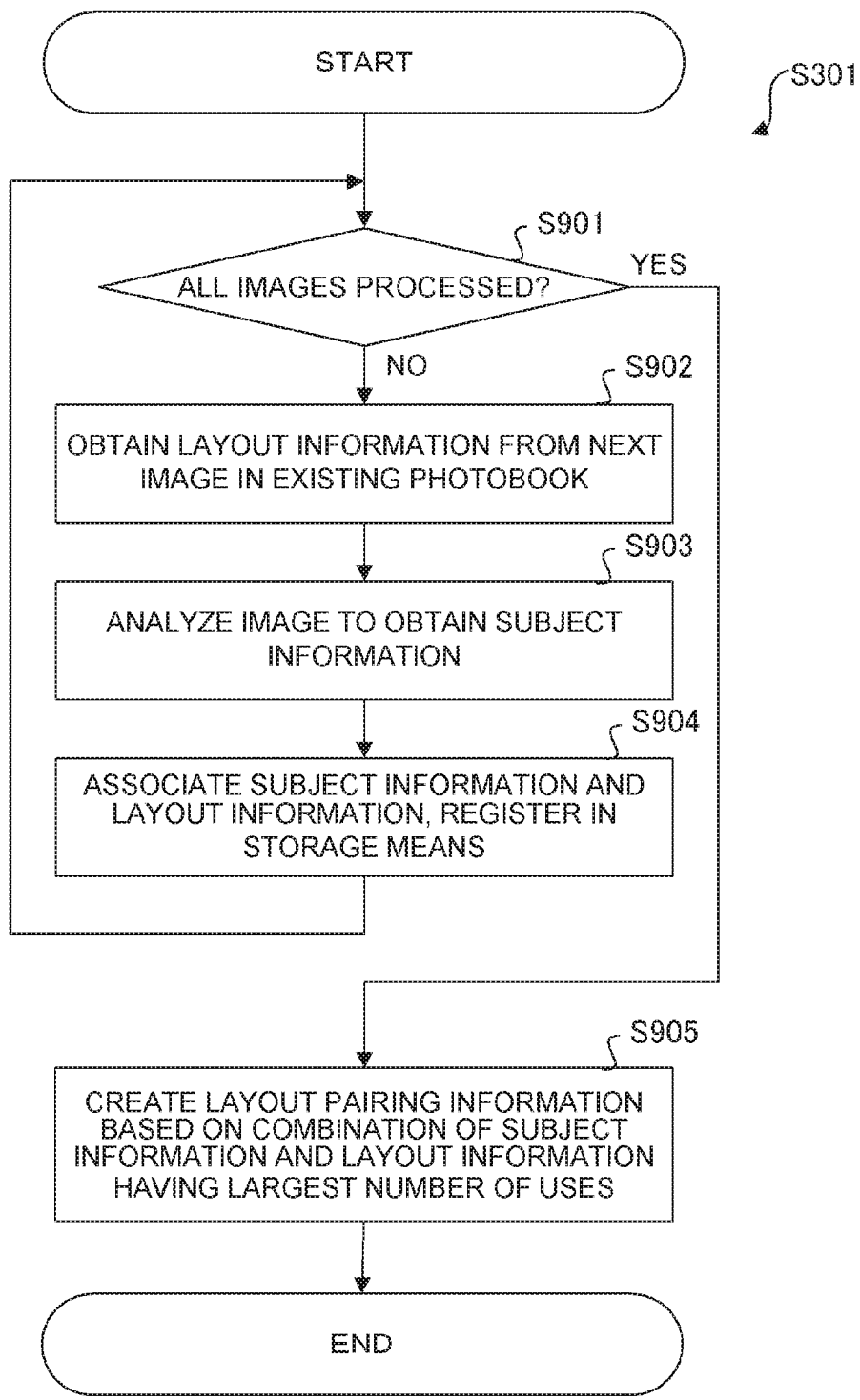
FIG. 9 is a flowchart showing procedures for creating the layout pairing information.

FIG. 9 is a flowchart showing the procedures for creating the layout pairing information. Note that in this embodiment, the flow of FIG. 9 corresponds to the processing of step S301 in the flow of FIG. 3.

In step S901, the pairing information creating means 201 determines whether or not all of the images in the photobook have been processed. When all of the images have been processed, the processing of FIG. 9 is terminated, and when an unprocessed image remains, the processing advances to step S902.

Note that the processing of this flow may be executed on a single photobook or a plurality of photobooks. When the processing of the flow is executed on a plurality of photobooks, a determination is made in step S901 as to whether or not the images in all of the photobooks have been processed.

In step S902, the pairing information creating means 201 obtains the layout information from the next image in the existing photobook. In a specific example, the pairing information creating means 201 obtains the following information as the layout information. Namely, information such as whether the image is arranged over a double spread or on a single page and whether a plurality of images are arranged on the same page or only the current image is obtained as the layout information. Further, information indicating the shape (square, rectangular, or the like) of the image is obtained as the layout information. Note that other information may also be obtained as the layout information.

Having obtained all of the layout information relating to the image on the page, the pairing information creating means 201 obtains the layout information of the image on the next page. Further, when there are a plurality of existing photobooks and all of the layout information relating to the images in the current photobook has been obtained, the pairing information creating means 201 obtains the layout information of the images in the next photobook.

In step S903, the image analyzing means 202 analyzes the image in order to obtain subject information such as the subject category and the image composition.

In step S904, the pairing information creating means 201 associates the subject information (category and composition) with the layout information and stores the associated information in the storage unit 205.

After the processing of steps S902 to S904 has been performed on all of the images in the photobook, the processing advances to step S905.

In step S905, the pairing information creating means 201 creates layout pairing information on the basis of a combination having the largest number of uses, among the combinations of subject information and layout information stored in the storage unit 205. The table shown in FIG. 4 can then be created by registering the layout pairing information on a table. Note that a specific example of the processing performed in step S905 will be described below using FIG. 10.

FIG. 10 is a view illustrating creation of the layout pairing information. The items category 1001, composition 1002, and layout 1003 are identical to FIG. 4. The number of uses 1004 denotes the number of times the same layout pairing information (i.e. the same combination of subject information and layout information) has been used in the photobook. The pairing information creating means 201 performs the processing of steps S902 to S904 on each of the images in the photobook and increments the number of uses every time identical layout pairing information occurs.

For example, the number of uses of a row 1005 in FIG. 10 is seven, while the number of uses of a row 1006, which has the same category and composition as the row 1005 but a different layout, is six. Further, the number of uses of a row 1007 is eight, while the number of uses of a row 1008, which has the same category and composition as the row 1007 but a different layout, is three.

When a plurality of rows having identical categories and compositions exist, the pairing information creating means 201 selects the tow having the largest number of uses and creates the layout pairing information on the basis of the selected row. For example, the number of uses of the row 1005 is seven while the number of uses of the row 1006, which has the same category and composition as the row 1005, is six, and therefore the pairing information creating means 201 creates the layout pairing information on the basis of the row 1005. Further, the number of uses of the row 1007 is eight while the number of uses of the row 1008, which has the same category and composition as the row 1007, is three, and therefore the pairing information creating means 201 creates the layout pairing information on the basis of the row 1007.

Hence, the layout pairing information is created on the basis of the layout that has been used the largest number of times in a photobook created in the past, and as a result, an improvement in estimation precision is achieved when estimating the layout in which the target image is to be arranged.

Further, the pairing information creating means 201 may count either the number of uses in a photobook created in the past by the user who is currently creating a photobook or the number of uses in a photobook created in the past by another user.

Furthermore, when a photobook created in the past by the user exists, the pairing information creating means 201 may count the number of uses in that photobook, and when no such photobook exists, the pairing information creating means 201 may count the number of uses in a photobook created in the past by another user.

Moreover, the pairing information creating means 201 may count the number of uses in an edited part of a photobook currently being created.

By counting the number of uses in a photobook created in the past by the user, the target image can be arranged in a layout corresponding to the preferences of the user. Further, by counting the number of uses in a large number of photobooks created in the past by other users, the layout estimation precision can be improved. Furthermore, by counting the number of uses in an edited part of a photobook currently being created, an improvement in working efficiency can be achieved by making use of the edited part of the photobook.

Third Embodiment

In this embodiment, a user interface employed during photobook creation will be described. After arranging the target images on each page on the basis of the layout information (the table) selected on the basis of the flow shown in FIG. 3, the information processing apparatus 10 displays a layout-editing user interface on the monitor 106. One or a plurality of layout information other than the layout information selected by the selecting means 203 are displayed on the user interface as layout candidates, from the plurality of layout information stored in the storage unit 205. A specific example of the user interface employed during photobook creation will be described below.

Figure 11:
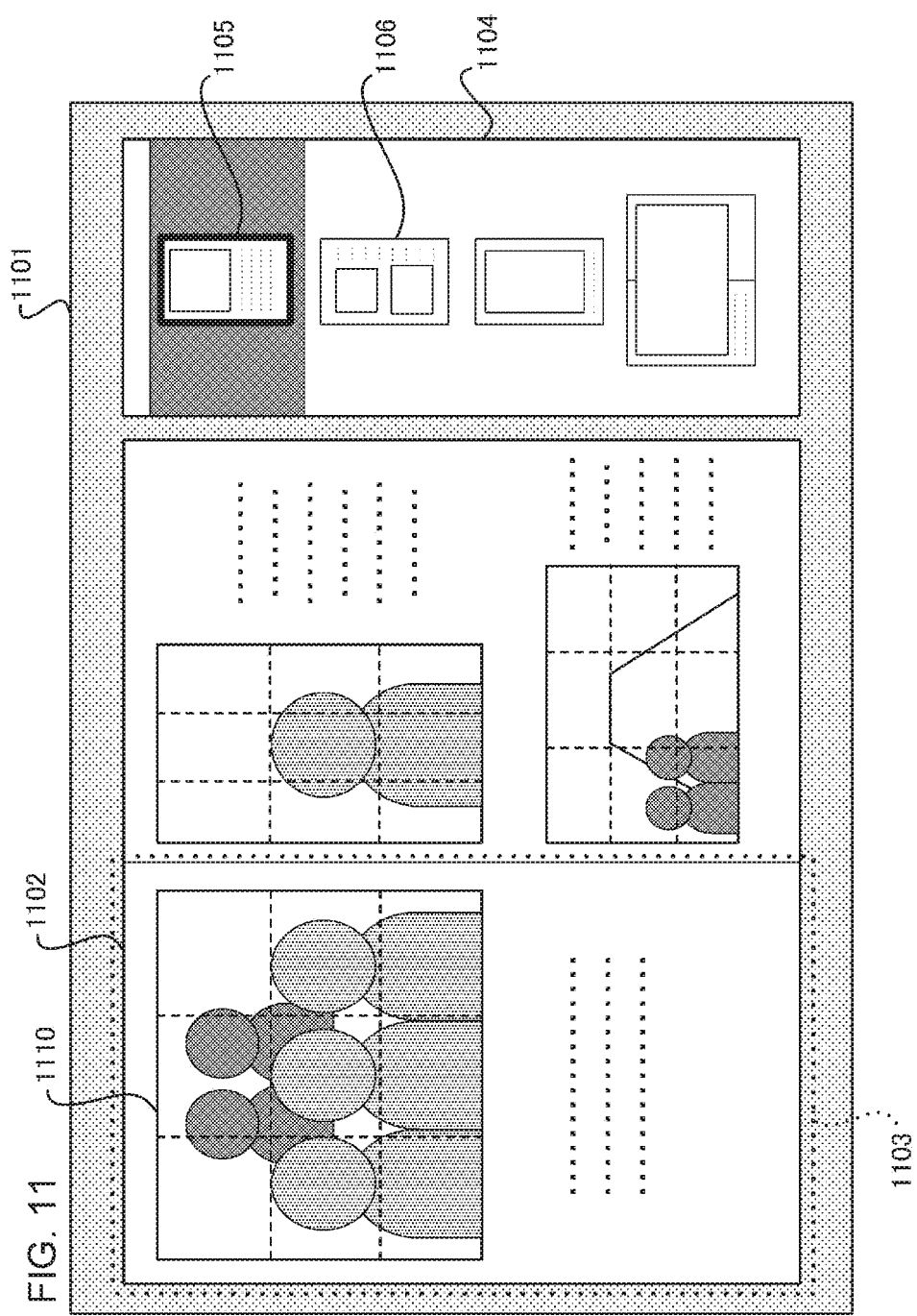
FIG. 11 is a view showing a first example of a layout-editing user interface.

FIG. 11 is a view showing a first example of the layout-editing user interface. A photobook 1102 is displayed on a user interface 1101 in a double spread state. A left-side page surrounded by dotted lines 1103 denotes a page currently being edited (referred to hereafter as an "edit page"). Using various input devices such as a mouse or a keyboard, the user can set the page to the right as the edit page in order to edit the page to the right, or set the previous page or the next page of the photobook 1102 as the edit page in order to edit that page.

Further, a layout list 1104 is displayed to the right of the photobook 1102. The layout list 1104 displays a list of layout candidates listed in candidate order. Procedures for selecting a layout candidate displayed on the layout list 1104 will be described below.

A layout candidate 1105 at the top of the layout list 1104 is the layout selected by the selecting means 203 during the flow of FIG. 3, and the layout candidate 1105 is displayed in a shaded region. Further, in an initial state, the layout candidate 1105 is selected. A marker constituted by a thick frame is displayed on the currently selected layout candidate, in this case the layout candidate 1105.

The user can select a layout candidate below the layout candidate 1105 by operating the mouse or the like. When the user selects a lower layout candidate, the marker is displayed on the selected layout candidate, and the image is rearranged in the layout corresponding to the selected layout candidate.

Figure 12:
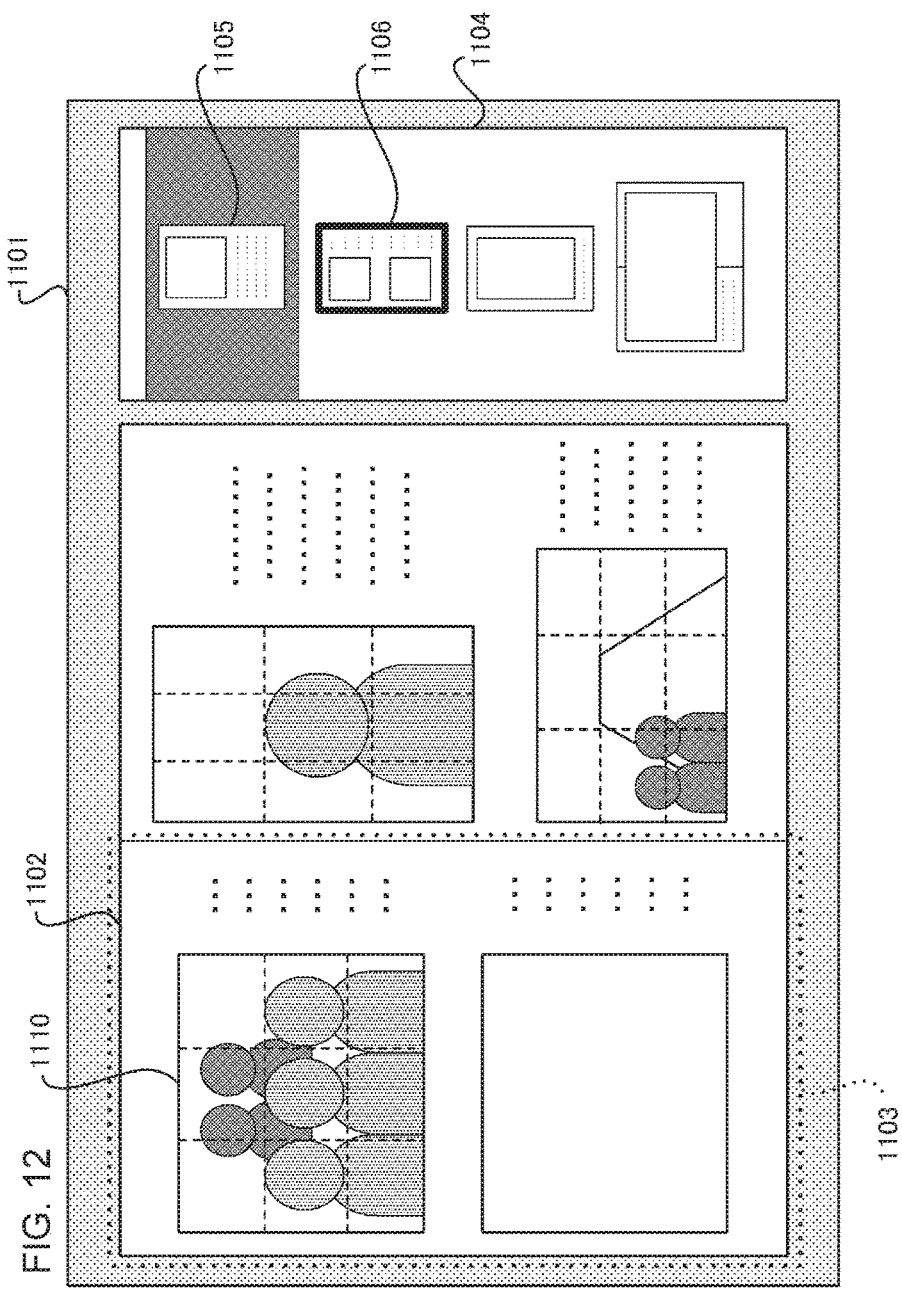
FIG. 12 is a view showing a second example of a layout-editing user interface.

FIG. 12 is a view showing a second example of the layout-editing user interface. When the user selects a layout candidate 1106, the thick frame-shaped marker is displayed on the layout candidate 1106. Further, the information processing apparatus 10 rearranges the image in the layout corresponding to the layout candidate 1106.

The layout candidate 1106 corresponds to a layout in which two images of a smaller size than the layout candidate 1105 are displayed. As shown in FIG. 12, an image 1110 is reduced so that a blank region in which another image is to be arranged is provided below the image 1110. The user can arrange another image in the blank region by operating the mouse or the like. Note that when a blank region is provided in this manner, the information processing apparatus 10 may automatically arrange the image on the next page in the blank region.

Next, procedures for selecting a layout candidate to be displayed on the layout list 1104 will be described. The correction candidate display means 204 (a correction display unit) selects a plurality of layouts that are likely to be employed, other than the layout selected by the selecting means 203, and displays the plurality of selected layouts on the layout list 1104 as layout candidates.

For example, the correction candidate display means 204 selects the layout information on rows that were not selected by the selecting means 203 during creation of the layout pairing information in FIG. 10 and so on but have comparatively high numbers of uses, and displays the selected layout information as layout candidates. For example, of the row 1005 and the row 1006 in FIG. 10, which have identical categories and compositions, the correction candidate display means 204 selects the layout A of the row 1006, which has the second largest number of uses, as a layout candidate.

The correction candidate display means 204 may also rearrange the layout candidates so that the layout candidates are displayed in (descending or ascending) order of the number of uses.

Further, the correction candidate display means 204 may select the layout information corresponding to the layout used when the user arranged the same image on a previous page and display the selected information as a layout candidate.

By displaying a list of layout candidates on the user interface so that layout candidates that are likely to be employed by the user can be selected, as described above, the number of times the user is required to rearrange the images manually can be reduced, leading to an improvement in working efficiency.

Note that the object of the present invention is achieved by executing the following processing. A storage medium on which program code for realizing the functions of the above embodiments is recorded is supplied to a system or a device, and a computer (or a CPU, an MPU, or the like) of the system or device reads the program code stored on the storage medium.

In this case, the program code read from the storage medium realizes the functions of the above embodiments, and therefore the present invention is constituted by the program code and the storage medium storing the program code.

Further, the following media may be used as the storage medium for supplying the program code. For example, the storage medium may be a floppy (registered trademark) disk, a hard disk, a magneto-optical disk, a CD-ROM, a CD-R, a CD-RW, a DVD-ROM, a DVD-RAM, a DVD-RW, a DVD+RW, magnetic tape, a nonvolatile memory card, a ROM, and so on. Alternatively, the program code may be downloaded over a network.

A case in which the functions of the above embodiments are realized by executing the program code read by the computer is also included in the present invention. In addition, a case in which an OS (operating system) or the like operating on a computer executes all or a part of the actual processing on the basis of commands included in the program code so that the functions of the above embodiments are realized by this processing is also included in the present invention.

Moreover, a case in which the functions of the above embodiments are realized by the following processing is included in the present invention. Program code read from a storage medium is written to a memory provided in a function expansion board inserted into a computer or a function expansion unit connected to a computer. Then, on the basis of commands included in the program code, a CPU or the like provided in the function expansion board or function expansion unit executes all or a part of the actual processing.

Furthermore, a case in which the functions of the above embodiments are realized on a plurality of computers via a network is included in the present invention. For example, the functions may be apportioned between a server and a client so that management functions are processed by the server and display functions are processed by the client. The present invention is not limited thereto, and instead, each computer may execute all or a part of the processing.

Preferred embodiments of the present invention were described above, but the present invention is not limited to these embodiments and may be subjected to various amendments and modifications within the scope of the spirit thereof.

Further, the present invention was described in detail above on the basis of preferred embodiments, but the present invention is not limited to these specific embodiments, and various other embodiments within a scope that does not depart from the spirit of the invention are included in the present invention. Furthermore, the above embodiments merely illustrate examples of the present invention and may be combined as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-210958, filed on Oct. 31, 2017, which is hereby incorporated by reference herein in its entirety.

What is claimed is:

1. An information processing apparatus comprising:
a processor; and
a memory storing a program which, when executed by the processor, causes the information processing apparatus to:
store, in advance, a plurality of combinations of associated subject information and layout information in a storage unit, each subject information indicating a type of a human or non-human subject appearing on an image and the layout information indicating a layout in which the image is to be arranged;
perform image analysis on a target image and obtain subject information relating to a subject appearing on the target image according to a result of the image analysis;
select layout information that corresponds to the obtained subject information in relation to the target image based on the plurality of combinations of associated subject information and layout information stored in the storage unit, and
arrange the target image according to the selected layout information,
wherein the plurality of combinations of associated subject information and layout information stored in the storage unit include at least one subject information indicating a human subject type associated with at least one layout information and at least one subject information indicating a non-human subject type associated with at least one layout information, and
wherein each subject information is stored in the storage unit in association with at least one layout information.

2. The information processing apparatus according to claim 1, wherein, when a plurality of types of subjects appear on the target image, the subject information relating to each subject is obtained, and
layout information that corresponds to subject information relating to a subject of a first type is preferentially selected, among the obtained subject information, from the plurality of layout information stored in the storage unit.

3. The information processing apparatus according to claim 2, wherein the subject of the first type is a person.

4. The information processing apparatus according to claim 1, wherein the subject information includes the number of subjects appearing on the target image.

5. The information processing apparatus according to claim 1, wherein the subject information includes position information indicating a position of the subject on the target image.

6. The information processing apparatus according to claim 5, wherein the position information of the subject is information indicating a region, among a plurality of regions obtained by segmenting the target image, to which the subject belongs.

7. The information processing apparatus according to claim 1, wherein the layout information includes information indicating a range in which the image is to be arranged.

8. The information processing apparatus according to claim 1, wherein the layout information includes information indicating a shape of the image.

9. The information processing apparatus according to claim 1, wherein the program when executed by the processor further causes the information processing apparatus to obtain subject information relating to a subject appearing on an image that is arranged on predetermined content and layout information indicating a layout of the image arranged on the predetermined content, associating the subject information and the layout information so as to create a combination thereof, and storing the created combination in the storage unit.

10. The information processing apparatus according to claim 9, wherein, when a plurality of combinations having identical subject information but different layout information is created, the combination in which the layout information has been used the largest number of times, among the plurality of combinations is stored in the storage unit.

11. The information processing apparatus according to claim 1, wherein the program when executed by the processor further causes the information processing apparatus to select, as a layout candidate, one or a plurality of layout information other than the selected layout information from the plurality of layout information stored in the storage unit, and the layout candidate is displayed on a screen.

12. A control method for an information processing apparatus, comprising:
- a step of performing image analysis on a target image and obtaining subject information relating to a subject appearing on the target image according to a result of the image analysis; and
- a step of selecting, from a plurality of layout information stored in a storage unit that stores, in advance, a plurality of combinations of associated subject information and layout information, each subject information indicating a type of a human or non-human subject appearing on an image and the layout information indicating a layout in which the image is to be arranged, layout information that corresponds to the subject information obtained in the obtaining step in relation to the target image based on the plurality of combinations of associated subject information and layout information stored in the storage unit, and
- a step of arranging the target image according to the selected layout information,
- wherein the plurality of combinations of associated subject information and layout information stored in the storage unit include at least one subject information indicating a human subject type associated with at least one layout information and at least one subject information indicating a non-human subject type associated with at least one layout information, and
- wherein each subject information is stored in the storage unit in association with at least one layout information.

13. A non-transitory computer readable storing medium recording a computer program for causing a computer to perform a method of controlling an information processing apparatus that determines a layout in which a target image is to be arranged, comprising:
- a step of performing image analysis on a target image and obtaining subject information relating to a subject appearing on the target image according to a result of the image analysis; and
- a step of selecting, from a plurality of layout information stored in a storage unit that stores, in advance, a plurality of combinations of associated subject information and layout information, each subject information indicating a type of human or non-human subject appearing on an image and the layout information indicating a layout in which the image is to be arranged, layout information that corresponds to the subject information obtained in the obtaining step in relation to the target image based on the plurality of combinations of associated subject information and layout information stored in the storage unit, and
- a step of arranging the target image according to the selected layout information,
- wherein the plurality of combinations of associated subject information and layout information stored in the storage unit include at least one subject information indicating a human subject type associated with at least one layout information and at least one subject information indicating a non-human subject type associated with at least one layout information, and
- wherein each subject information is stored in the storage unit in association with at least one layout information.

14. The information processing apparatus according to claim 4, wherein the subject information further includes category information indicating a group of subjects, to which the subject appearing on the target image belongs.

15. The information processing apparatus according to claim 5, wherein the subject information further includes category information indicating a group of subjects, to which the subject appearing on the target image belongs.

\* \* \* \* \*